UNITED STATES PATENT OFFICE.

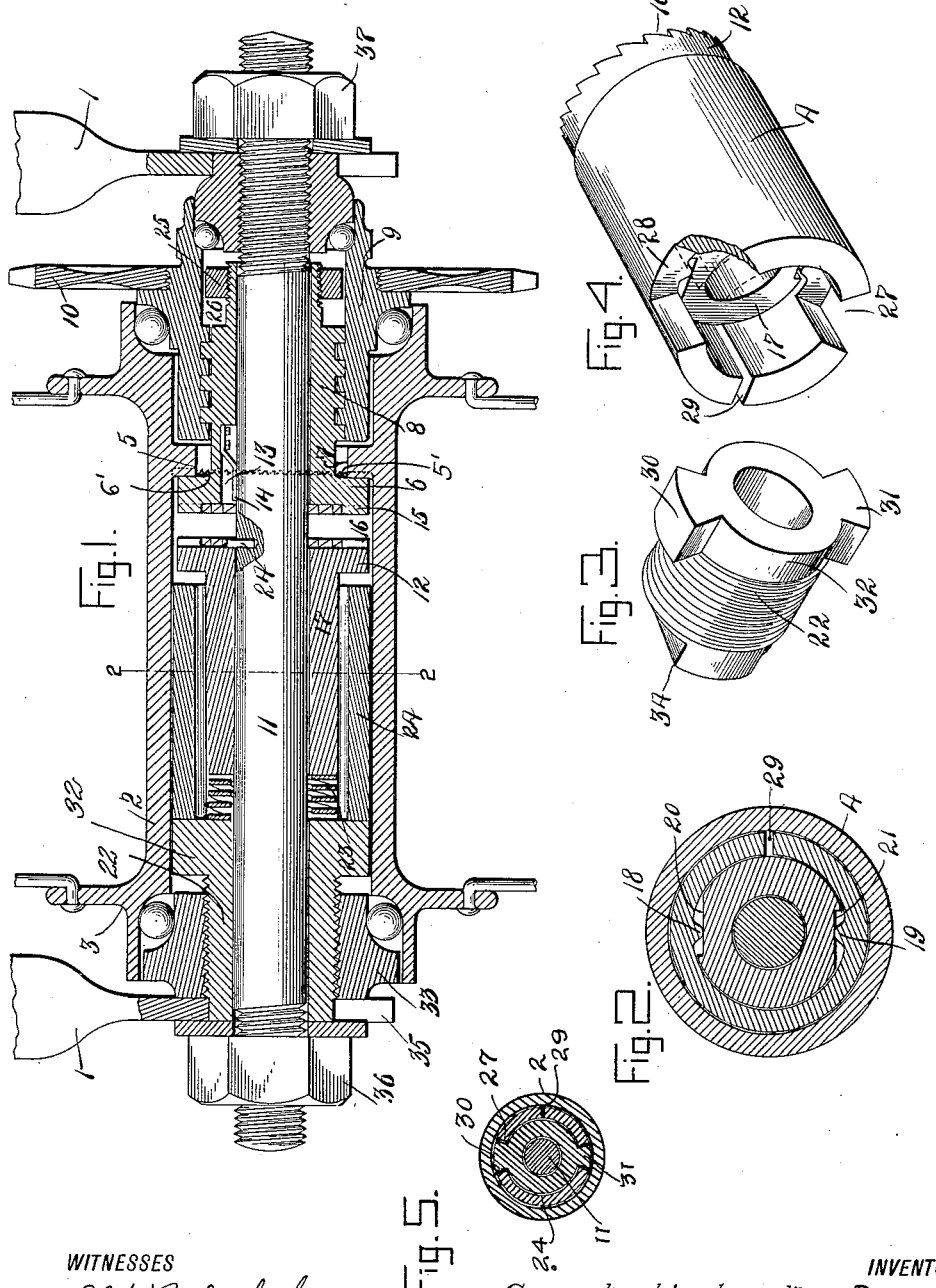

GEORGE WASHINGTON VAN DEREN, OF ELMIRA, NEW YORK.

COASTER-BRAKE.

1,100,930.   Specification of Letters Patent.   Patented June 23, 1914.

Application filed August 22, 1912.   Serial No. 716,431.

*To all whom it may concern:*

Be it known that I, GEORGE WASHINGTON VAN DEREN, a citizen of the United States, and a resident of Elmira, in the county of Chemung and State of New York, have invented a new and Improved Coaster-Brake, of which the following is a full, clear, and exact description.

This invention relates to improvements in coaster brakes for vehicles and the like, and has for an object to provide an improved structure in which a maximum braking surface is provided without changing the ordinary shape of the ordinary hub.

A further object of the invention is to provide an improved coaster brake which may utilize a large braking surface without injury to any of the parts, whereby a quicker and better braking action will result.

In carrying out these objects, a hub structure is provided formed with an annular lug against which a longitudinally movable clutch member is adapted to press when the same is acting to propel the hub. Associated with this clutch member is another clutch member designed to engage and expand a tubular brake shoe co-acting with a braking surface of the hub for substantially the full periphery of the hub and thus provide a quick and positive action.

A practical embodiment of the invention is represented in the accompanying drawings forming a part of this specification in which similar characters of reference indicate corresponding parts in all the views.

Figure 1 is a longitudinal vertical section through an embodiment of the invention; Fig. 2 is a section through Fig. 1 on the line 2—2; Fig. 3 is a detail perspective view of a shoe supporting means; and Fig. 4 is a detail perspective view of the shoe and associated clutch, certain parts being broken away; Fig. 5 is a transverse sectional view through the hub illustrating the relative positions of the stop member and the brake shoe.

Referring to the accompanying drawings by numerals, 1 indicates the ordinary rear forks of a bicycle, and 2 the barrel of the hub 3. The hub 3 has been mounted on a bicycle frame simply for the purpose of illustration, as the hub could be mounted in various other places without departing from the spirit of the invention. The barrel 2 of the hub 3 is formed comparatively thick in order to provide a friction surface for the brake shoe 4, and is also provided with an annular ring 5 for acting as a stop for the clutch head 6. The clutch head 6 is formed with a hub 7 provided with a threaded end 8 coacting with a threaded sleeve 9 to which the sprocket wheel 10 is secured. When the sprocket wheel 10 is rotating in a forward direction the threads on the sleeve 9 will engage or act against the threads on the threaded end 8 and draw the head 6 toward the annular flange 5 so as to engage the teeth 6' which are formed on the head 6, with the teeth 5' which are formed upon the flange 5 so as to rotate the entire hub. When the sprocket wheel 10 is reversed, the action of the threads on the members 8 and 9 will be reversed so that the head 6 will move longitudinally of the shaft or axle 11 until it engages the head 12. In order to cause a longitudinal movement of the head 6 instead of a rotary movement, a cut-out portion 13 is provided in which a spring 14 is mounted so as to bear continually against the shaft 11. This frictional engagement allows the head 6 and associated parts to rotate slightly when the brake is being used, but at other times allows only a longitudinal movement of the head 6 and associated parts. The face of the head 6 is provided with teeth 15 meshing with teeth 16 on the face of the head 12. When the sprocket wheel 10 moves in a reverse direction or backwardly, the head 6 and associated parts will move longitudinally of the axle 11 until the teeth 15 and 16 are interlocked, and then a continued rearward movement of the sprocket wheel 10 will cause a rearwardly rotary movement of the heads 6 and 12 and also of the hub 17 of head 12 which will communicate motion to the brake shoe 4 through the projections 18 and 19 (Fig. 2) acting on the flattened portions 20 and 21 provided on the hub 17. As the shoe 4 is held stationary by a stop 22, the rearward rotary movement of the hub 17 will cause the shoe 4 to spread and to act substantially for its full outer surface against the barrel 2 for braking or retarding the rotary movement thereof. When the heads 6 and 12 are engaged in order to prevent a too great longitudinal movement of the head 12, a spring 23 is provided for normally tending to press the head 12 against the pin 24. The longitudinal movement of the head 6 and associated parts toward the center of the hub is limited by an adjustable stop 25 which abuts against a shoulder 26 when the head 6 and associated parts have reached their extreme limit of movement.

The brake shoe 4 is provided with notches or cut-out portions 27 and 28 and with a slot 29 extending for the full length of the shoe. The notches 27 and 28 are adapted to receive extensions 30 and 31 projecting from the end 32 of the stop 22, the end 32 fitting into the end of the shoe 4 at the time that the extensions 30 and 31 fit into the notches 27 and 28. The stop 22 is provided with threads for accommodating the usual cone 33 and is flattened at 34 for fitting into a nut 35 in one of the rear forks 1. When the nuts 36 and 37 have been tightened the stop 22 is clamped in place and positively prevents any rotary movement of the shoe 4 but permits the same to expand against the barrel 2 for acting as a brake or retarder for the hub.

In operation when the brake is being applied, the sprocket wheel 10 is reversed or driven in a rotary movement toward the rear. This will cause a reverse rotary movement of the sleeve 9 and a consequent longitudinal movement of the head 6 and associated parts, whereby the head 6 will become disengaged or out of contact with the annular ring or projection 5 and will cause the teeth 15 to engage teeth 16 of the head 12. Upon this taking place a further longitudinal movement of the head 6 and associated parts is arrested by the stop 25 and then the rotary movement is produced which will cause the flattened portions 20 and 21 of the hub 17 to press against projections 18 and 19 for spreading the shoe 4 and pressing the same to a greater or less extent against the barrel 2. When it is desired to propel the hub forward, the sprocket wheel is moved in a forward rotary movement which will cause the sleeve 9 to act on the threaded end 8 and move the head 6 from engagement with the head 12 and into engagement or contact with the toothed surface 5′ of the annular ring or stop 5, whereupon power will be transmitted from head 6 to the hub 3 for rotating the same.

Having thus described my invention I claim as new and desire to secure by Letters Patent:—

1. A coaster brake comprising a hub structure formed with a barrel, an expanding sleeve acting as a brake shoe formed with a longitudinal slit dividing the sleeve at one point, said sleeve being formed with notches therein, a threaded stationary member formed with projections fitting into said notches to hold the sleeve against rotation, said sleeve being provided with raised portions or projections expanding radially inwardly at points approximately 90° on each side of the slit, a rotatable member formed with a flattened portion engaging said raised portions, and means for actuating said rotatable member.

2. In a coaster brake, a hub structure formed with a barrel, an expansible sleeve acting as a brake shoe adapted to engage said barrel, means including a clutch face for causing the expansion of said sleeve, said sleeve being formed with notches therein, a threaded stationary member formed with projections fitting into said notches, a second clutch face designed to at times engage said first mentioned clutch face for rotating the same, a threaded shank extending from said second mentioned clutch face, a spring extending from said shank for frictionally holding said shank against rotary motion, means extending from said barrel into the path of movement of said second mentioned clutch face whereby said second mentioned clutch face when in engagement with said stop will cause a rotary movement of said barrel upon the continued rotary movement of said second mentioned clutch face, and a threaded sleeve fitting over said threaded shank adapted to reciprocate said threaded shank and said second mentioned clutch face and rotate the same.

3. A coaster brake including a hub formed with a barrel and a sprocket, a split sleeve acting as a brake shoe, said sleeve fitting into said barrel and adapted to be expanded for frictional engagement with the barrel, a stationary member acting as a stop engaging said shoe for holding the same against rotary movement while permitting the same to freely expand against said barrel, a rotatable member formed with flattened portions, inwardly extending lugs formed on said sleeve and at approximately 90 degrees from the split in the sleeve to engage the flattened portions of the rotatable member whereby the sleeve will be expanded in opposite directions and swing or bend from a point substantially diametrically opposite the split whereby the sleeve is caused to frictionally engage the inner surface of said barrel, a reciprocating and rotating clutch member adapted to engage and rotate said rotatable member, a rotatable sleeve connected with said reciprocating and rotating clutch member and with said sprocket whereby when said sprocket is operated, said rotatable member will be operated.

4. In a coaster brake, a hub formed with a barrel, a sprocket wheel, a shoe adapted to press against said barrel when acting as a brake, said shoe being formed tubular and divided from one end to the other at one point, said shoe being provided with inwardly extending projections positioned diametrically opposite and at substantially a 90° angle from the slit or dividing line of the shoe is caused to frictionally engage said projections for spreading the shoe whereby the shoe is caused to frictionally engage said barrel, said shoe being formed with notches therein, a threaded stationary member formed with projections fitting into said notches, a reciprocating and rotating clutch adapted to engage and rotate said rotatable member, a rotatable sleeve connected with said reciprocating and rotating clutch and with said sprocket for causing the operation of said rotatable member.

5. In a coaster brake, a hub formed with a barrel having an annular inwardly extending flange, a brake shoe adapted to engage said barrel, a rotatable member for causing said brake shoe to press against said barrel, said shoe being formed with notches therein, a threaded stationary member formed with projections fitting into said notches, a power member adapted to at one time engage said annular flange for conveying power to said barrel for rotating the same and at another time act as means for rotating the brake shoe, said power member being formed with a cut away portion, a spring rigidly secured at one end to said power member in said cut away portion so that the free end thereof may act as a friction brake for the power member whereby the rotary movement of the power member is frictionally resisted, said power member being formed with a threaded shank and internally threaded sleeve fitting over said threaded shank, a stop connected with said power member designed to engage said threaded sleeve when the threaded sleeve is being rotated in a reverse direction for limiting the longitudinal movement of the power member without interrupting its rotary movement.

6. In a coaster brake, a hub formed with a barrel and a sprocket, a sleeve split from one end to the other acting as a brake shoe, said sleeve fitting into said barrel, said sleeve being formed with a notch therein, a threaded stationary member formed with a projection fitting into said notch, a cone fitting on said threaded stationary member, said shoe being provided with inwardly extending projections positioned diametrically opposite and substantially a 90° angle from the slit or dividing line of the shoe, a rotatable member engaging said projections for spreading the shoe whereby the same is caused to frictionally engage the inner surface of the barrel, and a plurality of means arranged between said sprocket wheel and said rotatable member for causing movement to be transmitted from the sprocket wheel to the rotatable member in order to operate the same.

In testimony whereof I have signed my name to this specification in the presence of two subscribing witnesses.

GEORGE WASHINGTON VAN DEREN.

Witnesses:
JAMES D. AYERS,
THOMAS M. LOSIE.

---

Copies of this patent may be obtained for five cents each, by addressing the "Commissioner of Patents, Washington, D. C."